United States Patent
Zanella et al.

(10) Patent No.: US 7,497,491 B2
(45) Date of Patent: Mar. 3, 2009

(54) MULTI-FUNCTION MOTOR-VEHICLE BUMPER

(75) Inventors: Alessandro Zanella, Torino (IT); Francesco Butera, Torino (IT)

(73) Assignee: C.R.F. Societa Consortile per Azioni, Orbassano (Torino) (IT)

( * ) Notice: Subject to any disclaimer, the term of this patent is extended or adjusted under 35 U.S.C. 154(b) by 250 days.

(21) Appl. No.: 11/116,433

(22) Filed: Apr. 28, 2005

(65) Prior Publication Data
US 2005/0242596 A1 Nov. 3, 2005

(30) Foreign Application Priority Data
May 3, 2004 (EP) .................. 04425312

(51) Int. Cl.
*B60R 19/02* (2006.01)
(52) U.S. Cl. .................. 293/102; 293/117; 180/274; 340/436; 701/301
(58) Field of Classification Search ................ 293/162, 293/117, 116, 118, 102; 180/271, 274, 282; 296/180.1, 180.5; 340/436; 70/301; 701/301
See application file for complete search history.

(56) References Cited

U.S. PATENT DOCUMENTS

| | | | | |
|---|---|---|---|---|
| 4,674,073 A | * | 6/1987 | Naruse | 367/105 |
| 5,493,269 A | * | 2/1996 | Durley et al. | 340/433 |
| 6,318,774 B1 | * | 11/2001 | Karr et al. | 293/117 |
| 6,784,792 B2 | * | 8/2004 | Mattes et al. | 340/436 |
| 7,021,805 B2 | * | 4/2006 | Amano et al. | 362/518 |
| 7,047,132 B2 | * | 5/2006 | Jacobs | 701/301 |
| 7,147,269 B2 | * | 12/2006 | Aase et al. | 296/180.1 |
| 7,195,305 B2 | * | 3/2007 | Urushiyama et al. | 296/187.03 |
| 2002/0180597 A1 | * | 12/2002 | Flick | 340/436 |
| 2004/0037087 A1 | * | 2/2004 | Desai | 362/541 |
| 2005/0104721 A1 | * | 5/2005 | Mae et al. | 340/436 |
| 2005/0154530 A1 | * | 7/2005 | Hosokawa et al. | 701/301 |
| 2005/0194815 A1 | * | 9/2005 | Mc Knight et al. | 296/180.5 |
| 2006/0158066 A1 | * | 7/2006 | Oda et al. | 310/338 |
| 2006/0284515 A1 | * | 12/2006 | Nakajima | 310/311 |

FOREIGN PATENT DOCUMENTS

| | | | |
|---|---|---|---|
| DE | 38 12 182 A1 | | 10/1989 |
| EP | 0 642 843 A1 | | 3/1995 |
| EP | 1 344 696 | | 9/2003 |
| JP | 2006-129129 A | * | 7/2004 |
| WO | WO 03/082639 A1 | | 10/2003 |

* cited by examiner

*Primary Examiner*—Jason S Morrow
(74) *Attorney, Agent, or Firm*—Nixon & Vanderhye P.C.

(57) ABSTRACT

A motor-vehicle bumper is provided with a number of piezoelectric elements which are connected to an electronic control unit programmed to operate one or more of the piezoelectric elements such that each of them, or one or more groups of them, fulfil different functions in different conditions of operation of the motor-vehicle.

5 Claims, 3 Drawing Sheets

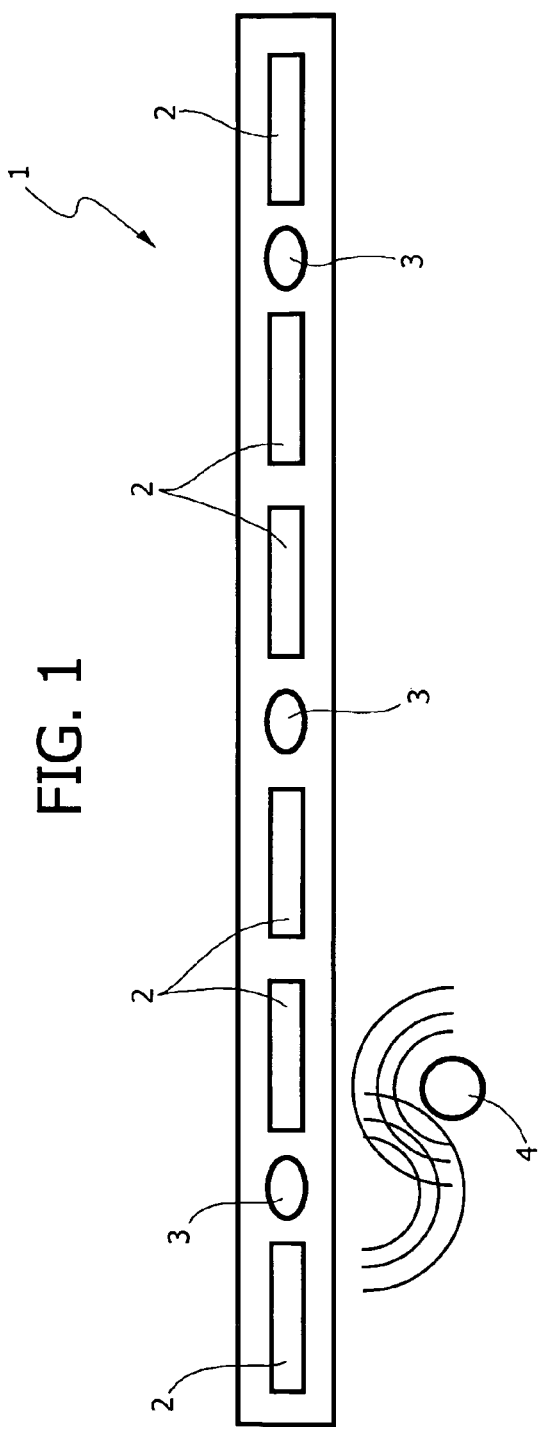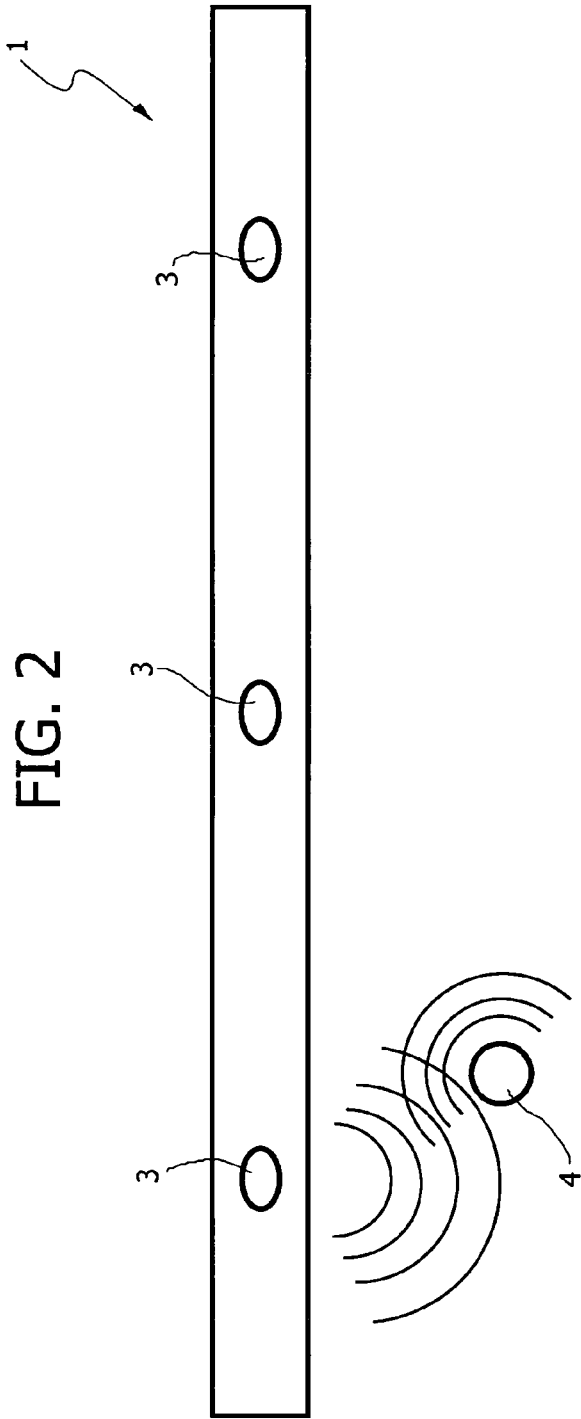

MULTI-FUNCTION MOTOR-VEHICLE BUMPER

BACKGROUND OF THE INVENTION

The present invention relates to a motor-vehicle bumper provided with piezoelectric elements.

The Applicant has already proposed in its European patent application EP 1 344 696 A1 a motor-vehicle bumper provided with piezoelectric sensors able to detect a collision with a pedestrian, in particular for the purpose of activating safety means, for example constituted by a portion of boot able to be lifted, for preventing the pedestrian's head from impacting the windshield of the motor-vehicle.

SUMMARY OF THE INVENTION

The present invention results from a more general approach and its purpose is to provide a multi-functional bumper able to serve not only the function of detecting an impact with a pedestrian, but also a series of additional functions, all with a relatively simple, low cost structure.

In view of achieving this object, the invention is directed to a motor-vehicle bumper provided with a number of piezoelectric elements, characterised in that the piezoelectric elements are connected to an electronic control unit, and that said control unit is programmed to operate one or more of said piezoelectric elements such that each of them or a group of them, fulfils different functions in different conditions of operation of the motor-vehicle.

In a preferred embodiment, the motor-vehicle bumper according to the invention is characterised in that each of said multi-function piezoelectric elements, or each group thereof, is able to fulfil at least two of the following different functions in different conditions of operation of the motor-vehicle:

- impact detection at vehicle speeds greater than a first threshold value,
- detection of the proximity of an obstacle, at vehicle speeds lower than a second threshold value lower than said first threshold value,
- sound emission, in an other specific range of vehicle speeds, and
- sensing the structural behaviour of the bumper, for example at zero speed.

According to a further preferred feature, each of the multi-functional piezoelectric elements or each group thereof

- acts as a passive element in the impact detection mode, providing an output signal depending for the force applied thereon,
- acts both as an emitter and as a receiver in the proximity detection mode and in the structural sensing mode, and
- acts as an emitter in the second emission in the sound emission mode.

Preferably the piezoelectric elements are controllable to provide a sound emission with sound indicator function (horn).

According to the invention, the piezoelectric elements can be selected among:

1) piezoelectric polymers, flexible and highly deformable, distributed in individual strip elements of about 15-10 cm (to optimise deformation on the impact with leg sized objects), 2) piezoelectric ceramic elements made with ceramic and resin between electrodes. They have a flexible structure and are usable as "benders" (flexible laminas). Elements of this type are marketed for example by the company ACX (Active Control Experts) under the "Quick Pack" mark;

3) "Bulk" piezoelectric elements, constituted by small, purely ceramic elements, usable as high frequency emitters and sensors, as well as sensors and as emitters for ultrasound distance sensors and parking sensors.

The advantage of ceramics over polymers is the greater processing ease and the better performance if used as actuators. All types of materials are suitable as sensors with different characteristics.

All elements, both polymeric and ceramic, of the Bulk or Bender Quick Pack type or of any other types, can serve both as emitters (for ultrasonic distance sensors, emitters for self-diagnosing of the state of the bumper, sound emitters, etc.) and as sensors (to detect and discriminate the impact, to detect the reflected wave if used as distance sensors, to detect sound wave propagation in the bumper for self-diagnostics, etc.).

Use as distance sensors allows to pre-trigger the impact event to prepare any actuation beforehand.

In one possible solution, said piezoelectric elements comprise a multi-function group of piezoelectric elements, said group comprising a first series of piezoelectric elements which are solely to serve as emitters and as a second series of piezoelectric elements which are to serve solely as receivers. Alternatively, the piezoelectric elements comprise multi-function piezoelectric elements each of which is controllable to serve either as an emitter or as a receiver in different time intervals.

In a specific embodiment, the piezoelectric elements comprise a multi-function group of piezoelectric elements, comprising a first series of piezoelectric elements which are solely to serve as emitters of predetermined waves and a second series of piezoelectric elements which are solely to serve as receivers of said predetermined generated waves, for enabling an analyses of the structural state of the bumper to be performed by the electronic control unit.

In the preferred embodiment, the bumper has a body of plastic material and the piezoelectric elements are embedded in the body of the plastic material. Preferably, the bumper body includes a shell-like structure of plastic material with a wall in which said piezoelectric elements are embedded, with each of said elements having a relatively flattened body arranged within said wall.

Also, in the preferred embodiment, within a wall of the bumper body there are embedded also wires or threads made of a shape memory alloy. Preferably, at least some of the shape memory wires are connected to electric supply means which are controlled to cause their activation following a passage of an electric current through said wires.

Also preferably, a programmable electronic control unit activates the shape memory wires in predetermined conditions of operation of the vehicle. For example, the electronic control unit activates the shape memory wires at vehicle speeds greater than a predetermined value, to strengthen the bumper structure. The electronic control unit may also activate the shape memory wires to move a deflectable portion of the bumper body to a different position in order to provide an aerodynamic fence or dam in the lower portion of the bumper.

It is also possible to arrange the shape memory wires so that they are in an activated conditions at ambient temperature, to show a super-elastic behaviour, which increases the capability of the bumper to adsorb the energy of an impact.

Finally, in the preferred embodiment, the bumper of the invention is provided with chip LEDs or light emitting polymers, serving the function of vehicle-lamps, and embedded within a wall of the bumper. The motor-vehicle bumper according to the preferred features of the invention is therefore a compact, integrated structure where all the major components serving the functions of sensors, light devices, aerodynamic movable portions, etc. are integrated.

BRIEF DESCRIPTION OF THE DRAWINGS

Additional characteristics and advantages of the present invention shall become readily apparent from the description that follows with reference to the accompanying drawings, provided purely by way of non-limiting example, in which:

FIGS. 1-4 are front diagrammatic views of different embodiments of the bumper according to the invention.

DETAILED DESCRIPTION OF THE INVENTION

Figure 3:
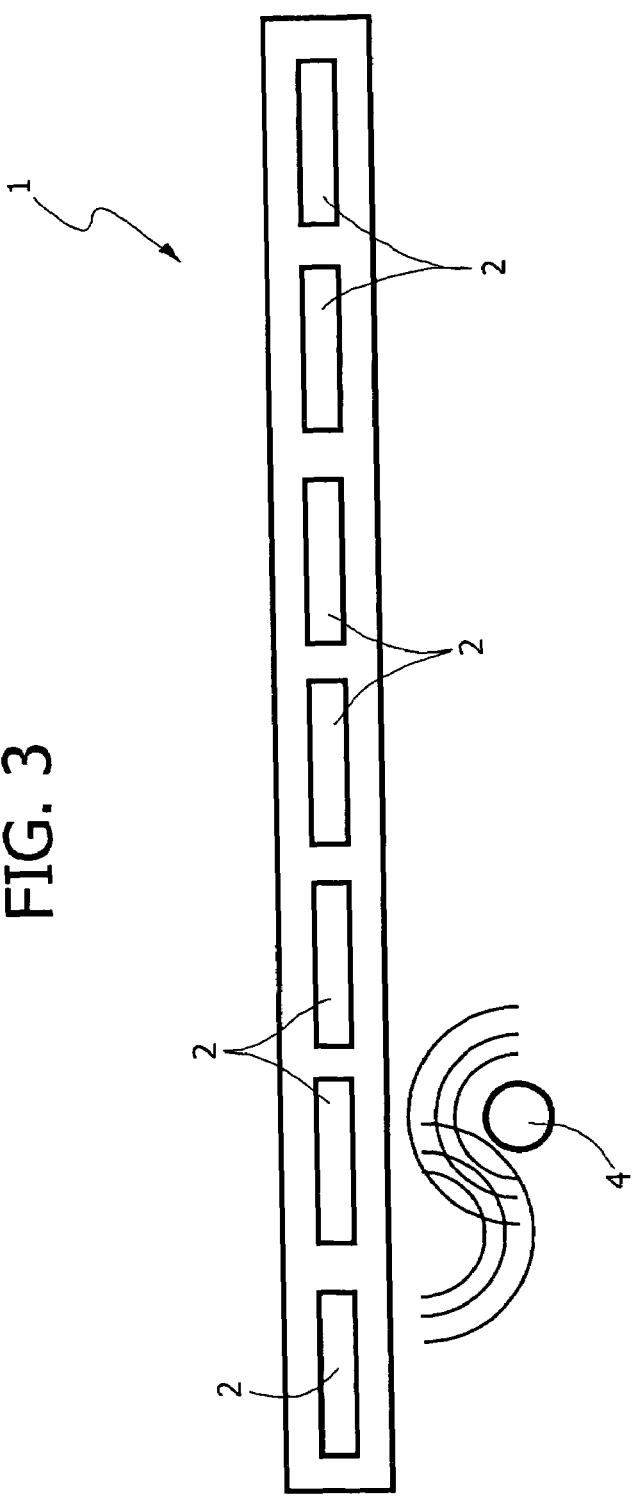

In the drawings, the reference number 1 globally designates a motor-vehicle front bumper. Naturally, nothing precludes applying the invention to a rear bumper.

The bumper is shown only schematically in the accompanying drawings. The structure of the bumper, the material that constitutes it, the means for connecting the bumper to the structure of the motor-vehicle can be constructed in any known fashion. Such constructive details have not been illustrated in the drawings, both because they, in themselves, are outside the scope of the present invention, and because their elimination from the drawings makes the drawings more easily and readily understood.

FIG. 1 refers to a first embodiment in which on the structure of the bumper 1 is provided a distribution of piezoelectric elements 2 of a first type and of piezoelectric elements 3 of a second type. The piezoelectric elements 2 are polymeric or ceramic sensors of the "long" type, for instance of the "Quick Pack" type, usable as receivers. The piezoelectric elements 3 are of the compact ceramic type, usable as emitters. Therefore, the elements 3 can be used in the emission of ultrasounds to measure the distance of an impacting object 4, and the piezoelectric elements 2 are exploited as detectors of the waves reflected by the object 4. In a bumper of the kind shown in FIG. 1, it is also possible to use a pre-trigger function whereby a discrimination and a recognition are performed on the impact from the deformation of the "long" elements 2. The small elements are mainly inserted as emitters.

FIG. 2 shows a second embodiment whose bumper 1 is provided solely with a series of piezoelectric elements 3 of the ceramic type, for instance "Bulk" or "Quick Pack", each of which is used both as an emitter and as a receiver. Naturally, all sensors are connected to an electronic control programmed to serve the different functions. In this case, the electronic control alternates emission phases with phases of analysing the echo by the piezoelectric elements 3. Alternatively, whilst an element 3 emits, a contiguous element thereto serves as a receiver. In the case of impact, though not hit directly, the piezoelectric elements 3 are able to analyse the wave of the vibration which propagates through the bumper as a result of the impact itself.

FIG. 3 shows a bumper 1 provided solely with a series of piezoelectric elements 2 of the polymeric or "long" ceramic type, for instance "Quick Pack", usable both as emitters and as receivers. Said elements are also usable as sound emitters (horn). In the case of the bumper of FIG. 3, a use as a pre-trigger can also be envisioned, by means of the emission/reception of ultrasounds, similarly to the previous case. A discrimination or a recognition of the impact is conducted from the analysis of the deformation of the "long" elements 2.

Figure 4:
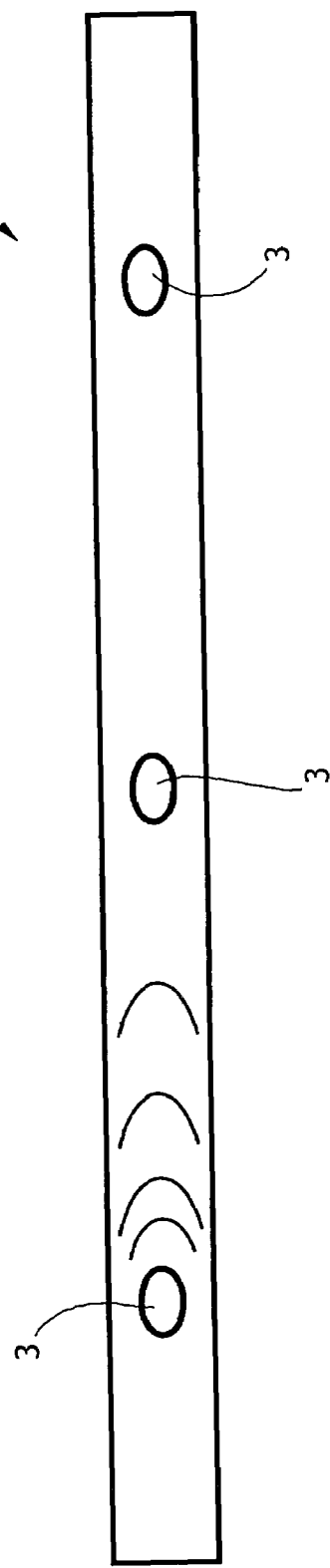

FIG. 4 shows an additional embodiment in which a series of compact piezoelectric elements 3 is provided, for example of the Bulk or Quick Pack type, some of which serve as emitters to perform a structural diagnosis of the bumper, whilst others serve as receivers, again with reference to the structural diagnosis of the bumper. A self-diagnosis is thereby obtained of the structural state of the bumper through the propagation of known waves generated by some piezoelectric elements 3 in the bumper and analysed in the form of a signal acquired by other piezoelectric elements 3 of the same bumper. The self-diagnosis can also be conducted by the single ceramic element with an adequate electronic control which checks the impedance characteristic and checks the electro-mechanical resonance points.

Figure 5:
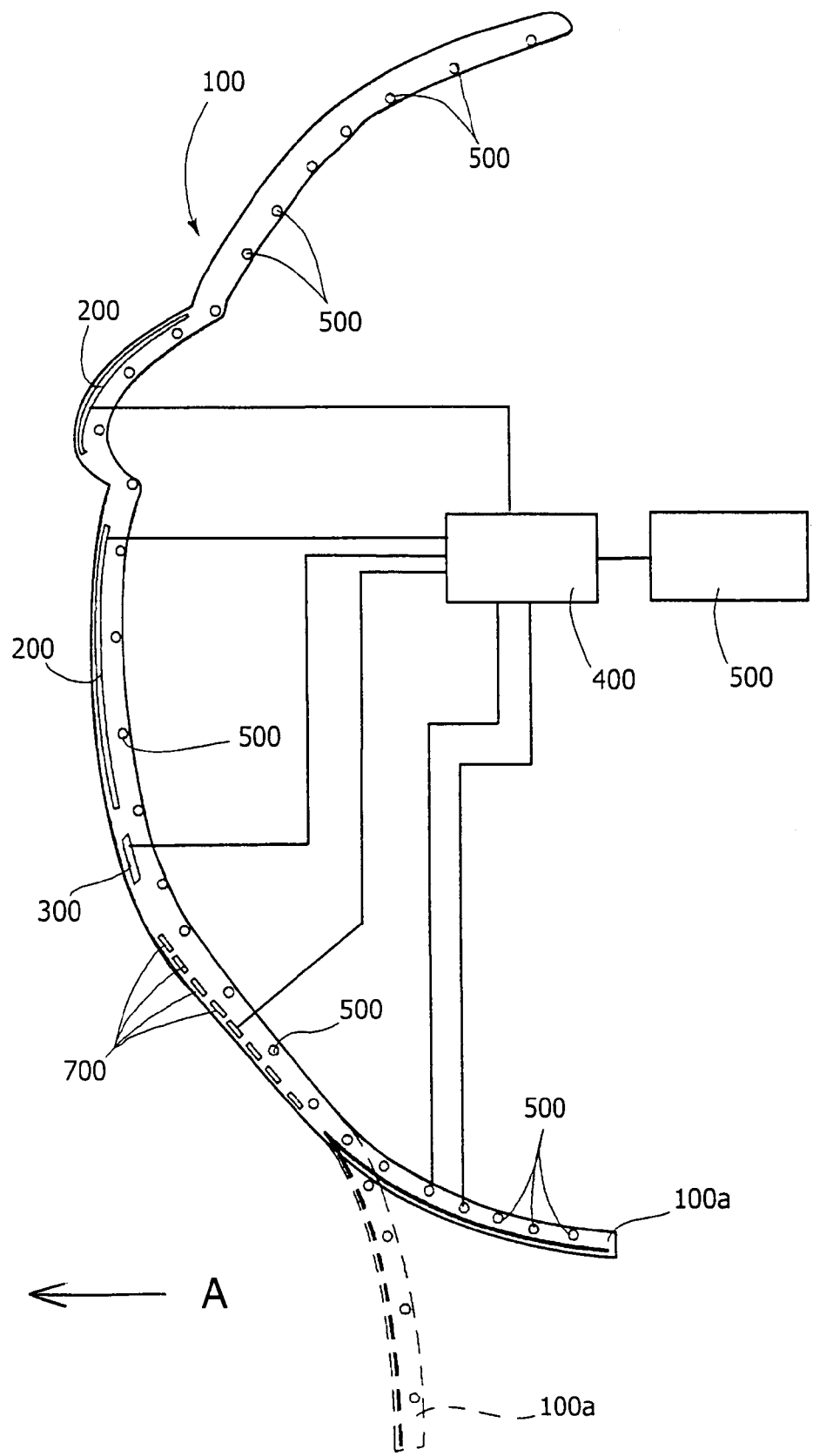
FIG. 5 is a cross-sectional view, in the longitudinal vertical plane of the vehicle, taken at an enlarged scale, which shows a preferred embodiment of the bumper according to the invention.

FIG. 5 shows a preferred embodiment of the bumper of the invention.

This figure shows a cross-sectional view of the bumper taken in a vertical plane parallel to the longitudinal direction of the vehicle (with reference to the mounted condition of the bumper on the vehicle).

Arrow A shows the direction of movement of the vehicle. As clearly shown in FIG. 5, the bumper has a body of plastic material in form of a shell-like structure 100 of plastic material of any known type in which a number of active elements are embedded. Reference numeral 200 designates piezofilm sensors which are used for impact detection. Reference numeral 300 designates a piezoceramic element for ultrasound detection of proximity of an obstacle. As disclosed in the foregoing, many of elements 200, 300 may be distributed along the width of the bumper. The various piezoelectric elements are controlled by an electronic control unit 400 so that each of them or some groups of them fulfil(s) different functions in different conditions of operation of the vehicle, typically at different ranges of speed of the vehicle. Theoretically, it will be possible to provide a single piezoelectric element or a single group of piezoelectric elements which:

acts as a passive element, in an impact detection mode, at vehicle speeds greater then a first threshold value (for example above 20 km/h), providing an output signal depending from the force applied thereon, acts both as an emitter and as a receiver in different time frames in a proximity detection mode, at vehicle speeds lower then a second threshold value (for example 5 Km/h), and acts as an emitter in a sound emission mode (horn), for example at a speed intermediate between the above indicated threshold values (i.e. between 5 and 50 Km/h).

It is also possible to provide a group of piezoelectric elements so that a part of them acts as emitters and a part of them acts as receivers in a structural sensing mode, as explained above, for example at zero speed of the vehicle.

In the preferred embodiment shown in FIG. 5, embedded within the wall 100 of plastic material constituting the bumper body there are also provided a number of wires 500 of a shape memory alloy. These wires provide strengthening of the bumper structure also when they are inactive. However, at least some of them can be connected through the electronic control unit 400 to electric supply means 600 so that they are activated due to the heating caused by the passage of the electric current. In the illustrated example, a net of shape memory wires 500 is provided within a lower deflectable wall 100a of the bumper to cause a movement of this wall towards a deployed condition (shown in dotted lines in FIG. 5) where it constitutes an aerodynamic fence or dam. When the shaped memory wires are deactivated, the portion 100a returns to the non deformed condition due to its elasticity.

Moreover, a number of shape memory wires can be set so that they are in their activated condition at ambient temperature, thus improving the ability of the bumper to adsorb impact energy due to their super-elastic behaviour.

Finally, in the bumper according to the invention, a number of chip LEDs 700 are also embedded within the wall 100 of plastic material which serve as light devices, for example as fog lamps or daylight running lights (DRL).

It is thus clearly apparent from the foregoing, that the bumper according to the preferred embodiment is a sort of "smart" bumper incorporating a number of different active elements which are all embedded within the wall of plastic material constituting the bumper body.

Naturally, without altering the principle of the invention, the construction details and the embodiments may vary widely from what is described and illustrated purely by way of example herein, without thereby departing from the scope of the present invention.

What is claimed is:

1. A motor-vehicle comprising a motor-vehicle body and a bumper mounted on the motor-vehicle body, said bumper including a bumper body with a shell structure of plastic material including a wall, wherein said bumper is provided with a number of piezoelectric elements positioned and controlled to serve the function of impact detectors, for detecting an impact with a pedestrian, wherein said piezoelectric elements are positioned and controlled to serve also the function of emitters and/or receivers, wherein said piezoelectric elements are selected from the group of piezoelectric polymers in the form of piezoelectric flexible elements, piezoelectric elements in the form of flexible laminas, and purely ceramic "Bulk" piezoelectric elements, wherein said piezoelectric elements are distributed on the surface of said wall of the bumper body, and wherein said piezoelectric elements are controlled so that, in addition to said impact detector function, they also operate as emitters or receivers for performing an ultra-sound detection function of proximity of an obstacle.

2. A motor vehicle as claimed in claim 1, wherein at least some of said piezoelectric elements are controlled so that, in addition to the impact detection function and the proximity detection function, they also operate as emitters of an acoustic signal.

3. A motor vehicle as claimed in claim 1, wherein at least some of said piezoelectric elements are controlled so that, in addition to the impact detection function and the proximity detection function, they also operate as emitters of known waves to be received and analyzed by other piezoelectric elements comprised in the same bumper to perform a function of self-diagnosing of the structural state of the bumper.

4. A motor vehicle as claimed in claim 1, wherein at least some of said piezoelectric elements which perform the impact detection function are also controlled to serve both as emitters and as receivers for proximity detection.

5. A motor vehicle as claimed in claim 1, wherein at least some of said piezoelectric elements which perform the impact detection function are also controlled to serve also as receivers for proximity detection.

* * * * *